(No Model.)
J. E. GAITLEY.
KETTLE BAIL.
No. 338,506. Patented Mar. 23, 1886.
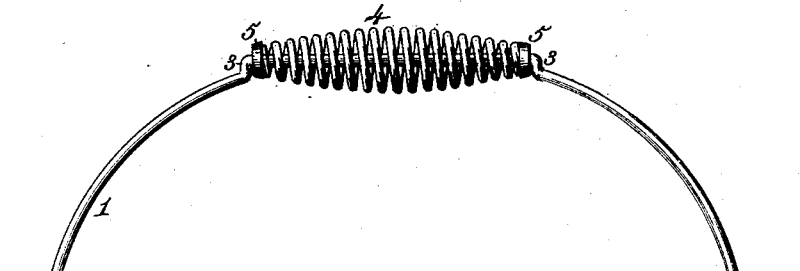
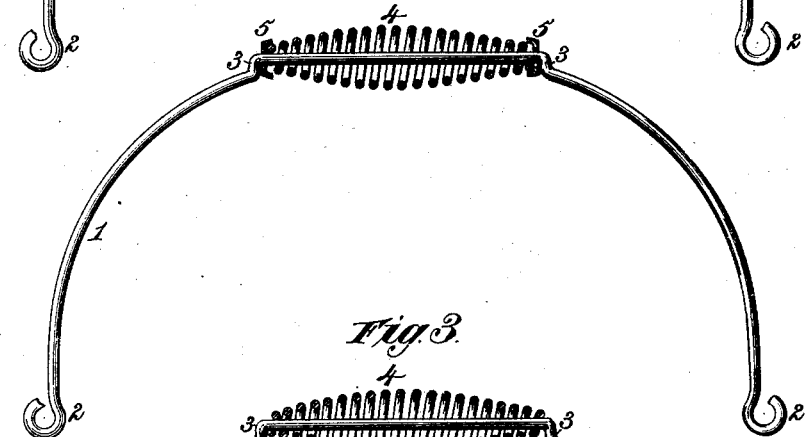
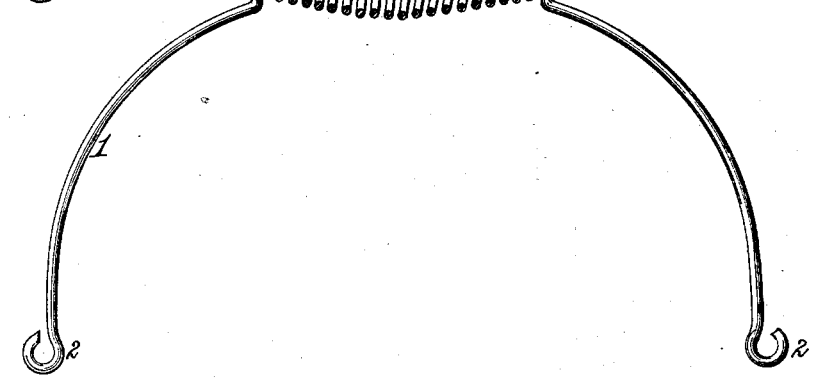
Witnesses.
Robert Everett,
Dennis Sumby.
Inventor:
John E. Gaitley
By James L. Norris.
Atty.

UNITED STATES PATENT OFFICE.

JOHN E. GAITLEY, OF TROY, NEW YORK.

KETTLE-BAIL.

SPECIFICATION forming part of Letters Patent No. 338,506, dated March 23, 1886.

Application filed May 13, 1885. Serial No. 165,378. (No model.)

*To all whom it may concern:*

Be it known that I, JOHN E. GAITLEY, a citizen of the United States, residing at Troy, in the county of Rensselaer and State of New York, have invented new and useful Improvements in Kettle-Bails, of which the following is a specification.

This invention has for its object to provide a novel and desirable bail for lifting and carrying kettles, pots, and similar vessels, whereby the handle or grasp part of the bail will remain sufficiently cool to permit the bail to be manipulated at any time.

The object of my invention I accomplish in the manner and by the means hereinafter described and claimed, reference being made to the accompanying drawings, in which—

Figure 1 is a side elevation of a bail constructed in accordance with my invention; Fig. 2, a longitudinal sectional view with the bail in elevation, and Fig. 3 a view similar to Fig. 2, showing a modification of the invention.

In order to enable those skilled in the art to make and use my invention, I will now describe the same in detail, reference being had to the drawings, where the number 1 indicates a bail, having hooks 2 or other devices at its ends for connecting with a kettle, pot, or other vessel, and provided intermediate its ends with two bends or other shoulders, 3 3.

The numeral 4 indicates a spiral metallic wire coiled in such manner that its diameter increases from each end toward the central portion, for the purpose of imparting to the coil a substantially elliptical form. The bail is inserted through this coil until the latter is brought between the shoulders or bends 3 of the bail, so that the coil occupies a position on the bail midway between its ends, thereby constituting a handle or grasp for manipulating the bail to lift and carry the kettle or other vessel.

As shown in Figs. 1 and 2, I prefer to place a disk, 5, between each end of the coil and the adjacent shoulder of the bail, the disks having cavities to receive the ends of the coil, but these disks may be omitted and the ends of the coil be made to bear directly against the shoulders on the bail, as shown in Fig. 3. By this construction of bail its handle or grasp portion is composed of a wire coil, which will remain sufficiently cool to permit the bail to be manipulated at any time, for the reason that as the bail is not in direct contact with the coil between the end portions of the latter the heat will not be readily conducted from the bail throughout the length of the coil forming the handle or grasp.

The shoulders or bends on the bail hold the coil against longitudinal displacement and serve to secure it in proper position under all circumstances.

Heretofore a bail has been provided with a coiled handle or grasp formed integral with the bail by coiling the latter centrally between its ends, and such, therefore, I disclaim.

Having thus described my invention, what I claim is—

A kettle-bail formed with two bends to produce abutments or shoulders, and provided with a separate coiled handle or grasp bearing at its ends against the bends, and through which coiled handle or grasp the bail centrally and loosely passes, substantially as described.

In testimony whereof I affix my signature in presence of two witnesses.

JOHN E. GAITLEY.

Witnesses:
GEORGE W. PERCY,
JOHN S. MCQUEEN.